Aug. 13, 1929.  D. F. WILLIAMS  1,724,541
FEATHER TREATING MACHINE
Filed March 10, 1928  4 Sheets-Sheet 2

Inventor
Dennis F. Williams

By Clarence A. O'Brien
Attorney

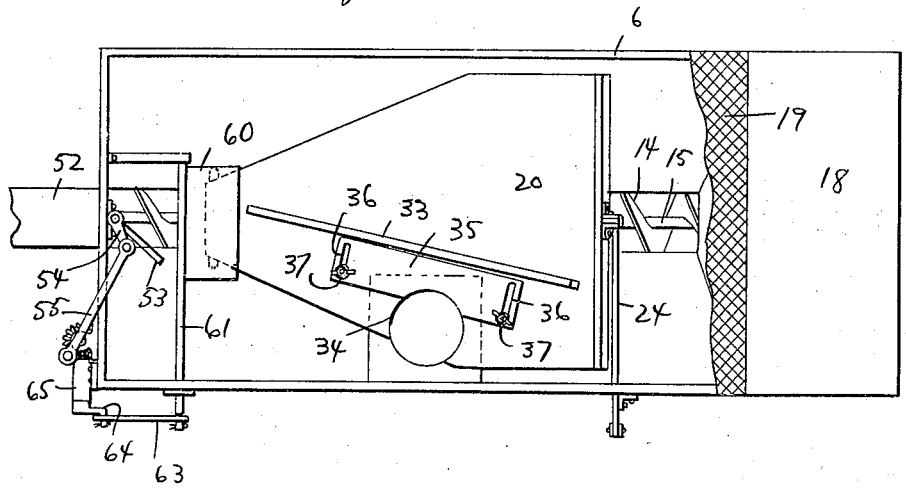
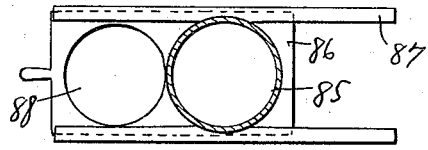
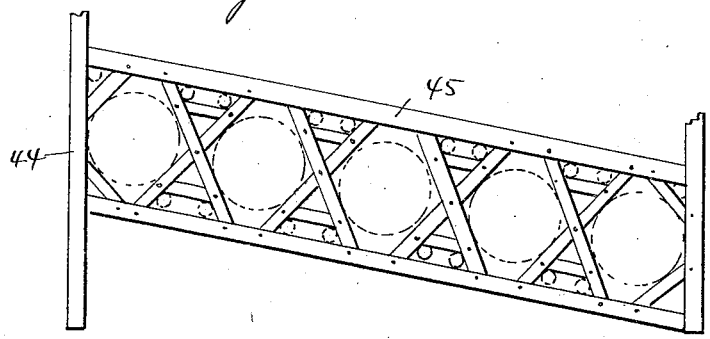

Aug. 13, 1929.                D. F. WILLIAMS                1,724,541
                        FEATHER TREATING MACHINE
                        Filed March 10, 1928        4 Sheets-Sheet 4
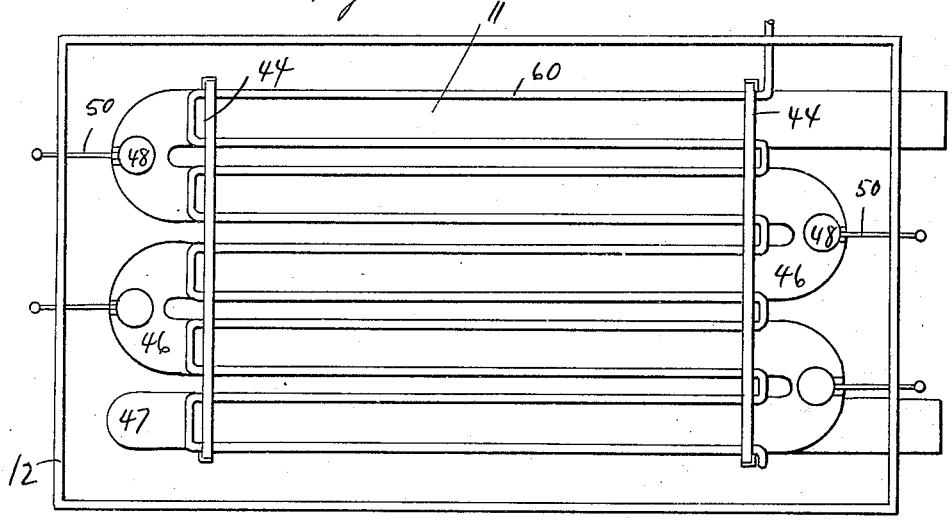
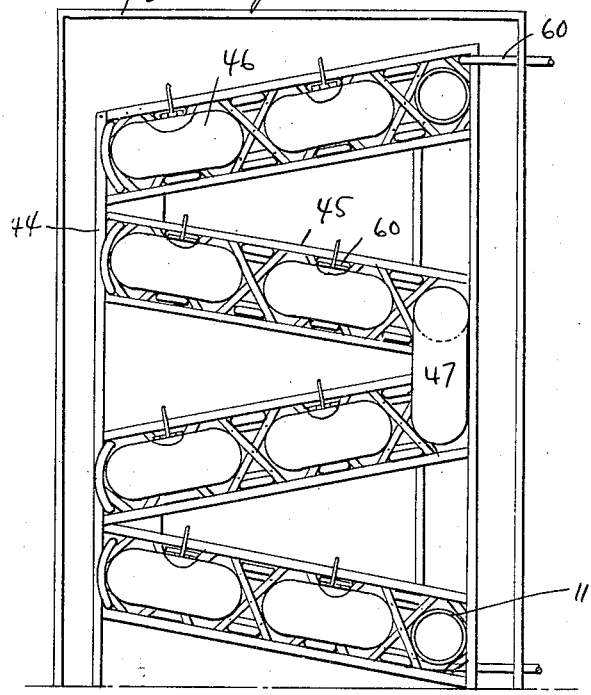
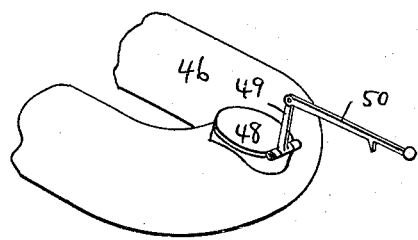
Inventor
Dennis F. Williams.
By Clarence A. O'Brien
                        Attorney Patented Aug. 13, 1929.

1,724,541

UNITED STATES PATENT OFFICE.

DENNIS F. WILLIAMS, OF KANSAS CITY, MISSOURI.

FEATHER-TREATING MACHINE.

Application filed March 10, 1928. Serial No. 260,666.

The present invention relates to the industrial drying, cleaning, and separating of feathers and like substances that can be dried and cleaned by air.

The primary object of the invention resides in the provision of a machine of this nature wherein there is created a current of air for conveying damp feathers through a heated conduit, and means for separating the light and heavy feathers after they have been dried by the heat.

Another very important object of the invention resides in the provision of a machine of this nature which will cause the feathers not thoroughly dried to be sent through the machine a second time.

A further very important object of the invention resides in the provision of a machine of this nature which is simple in its construction, convenient and compact in its arrangement of parts, thoroughly efficient and reliable in operation, and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawings:

Figure 5 is a top plan view thereof with a portion of the screening broken away.

Figure 6 is an enlarged detail section taken substantially on the line 6—6 of Figure 2.

Figure 7 is a detail elevation of one of the cross supporting structures in one of the frames.

Figure 8 is a plan view of the drying apparatus.

Figure 9 is an end elevation thereof, and

Figure 10 is a detail fragmentary perspective showing one of the bends in the drying conduit.

Figure 1:
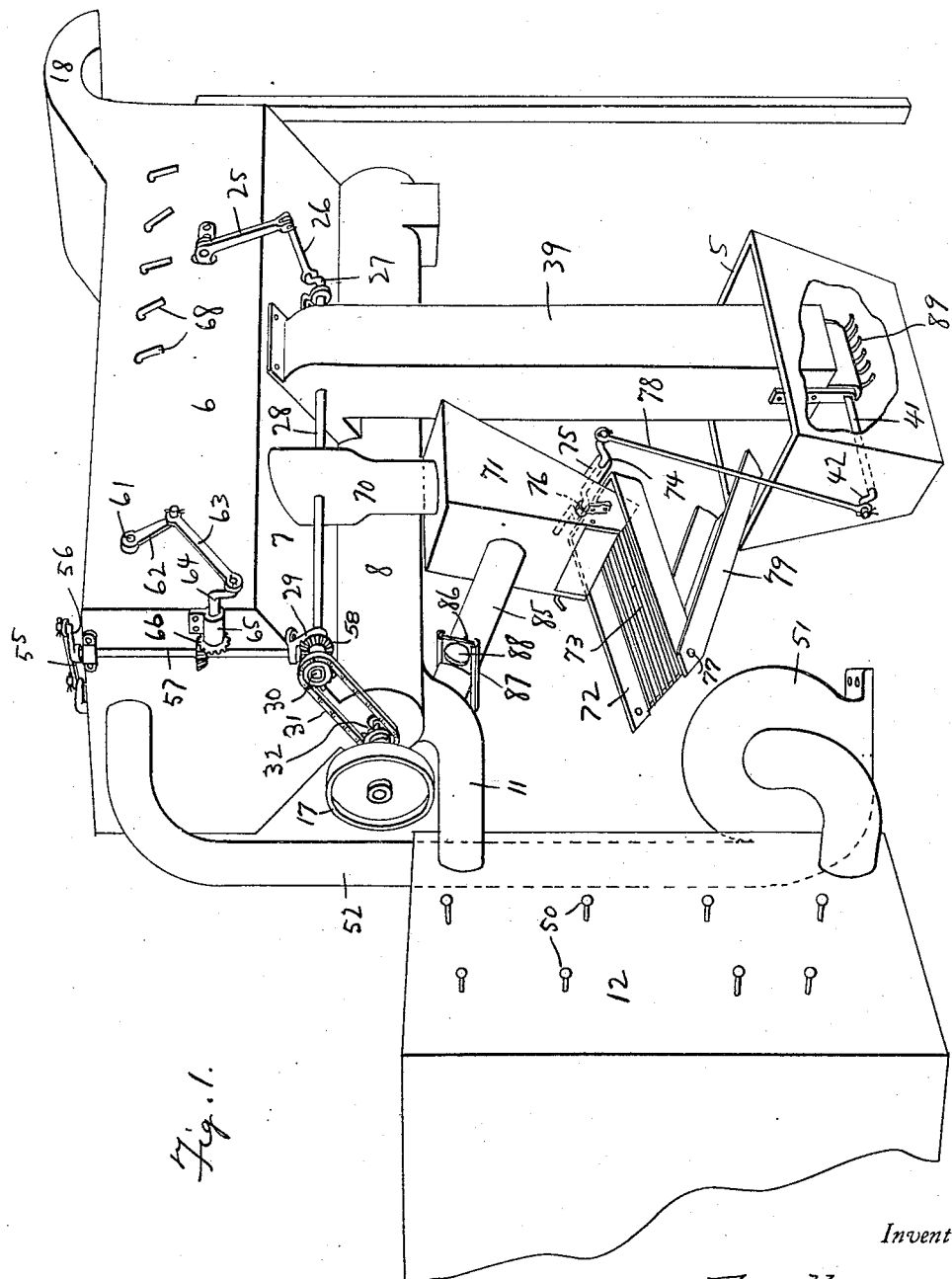
Figure 1 is a perspective view showing the machine embodying the features of my invention.
Figure 2:
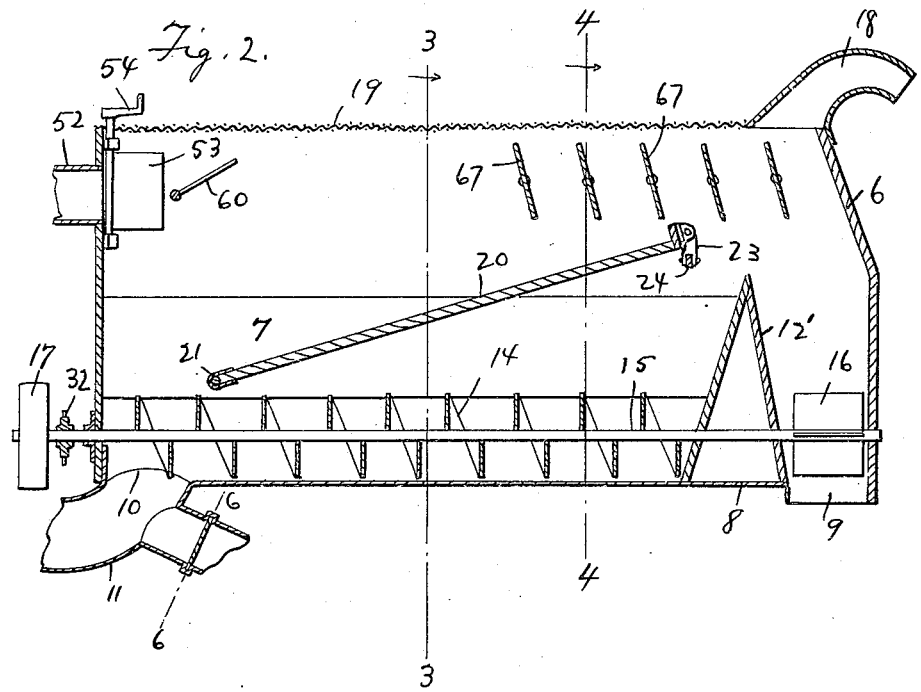
Figure 2 is a longitudinal vertical section through the separating and distributing casing.
Figure 3:
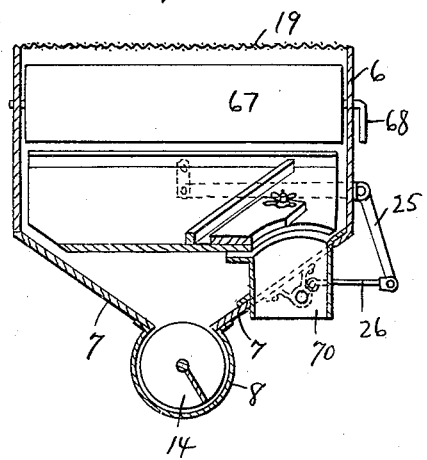
Figures 3 and 4 are transverse vertical sections therethrough.

Referring to the drawing in detail, it will be seen that the numeral 5 denotes a hopper, into which the feathers to be treated are dumped. The numeral 6 denotes a casing which has bottom sections 7 inclining downwardly and inwardly and merging into a longitudinally disposed cylindrical like trough 8, and an outlet 9 is provided at one end of the trough and an outlet 10 is provided at the other end thereof, and has a conduit 11 extending therefrom into the casing 12. A partition rises from the trough 8 adjacent the outlet 9 and is of an inverted V-shaped formation as is indicated at 12′. An augur 14 is journaled in the trough A and comprises a spiral blade on a shaft 15.

This shaft 15 is extended through the partition 12′ and has blades 16 on its end above the outlet 9. The other end of the shaft terminates outside of the casing and has a belt pulley 17 thereon, from which the machine is operated by any suitable source of power. An outlet spout 18 extends upwardly and outwardly from the top of the casing 6, at one end adjacent the outlet 9. A screen 19 is disposed over the top of the casing 6. A platform 20 has its lower end rockable, as at 21, between the bottom sections 7 and inclined upwardly toward the end having outlets 9 and 18, and the upper end thereof is engaged by a link 23 on the rock shaft 24, journaled transversely across the casing and actuated by a crank 25, exteriorly of the casing, linked as at 26, with the crank 27 of a shaft 28. This shaft 28 is journaled in a bracket 29 and has a sprocket 30 thereon, over which is trained a chain 31, also trained over a sprocket 32, on the shaft 15. This platform 20 has a bar 33 extending diagonally thereof and is formed with an opening 34, adjacent one side, with which is associated an adjustable plate 35. This plate is provided with transverse slots 36, through which rise bolts 37 with nuts thereon, so that the plates may be partially held across the opening. An elevator comprises a casing 39 rising from the hopper 5, to an opening in one of the bottom sections 7 and has an endless conveyor 40 therein, operable by the shaft 28, which is journaled through the top portion of the casing 39.

The lower shaft 41 of the endless conveyor is journaled through one side of the hopper 5 and terminates in a crank 42, for a purpose which will be brought out later.

In the casing 12 there is mounted a pair of upright frames 44, with transversely slanting supporting structures 45, which are arranged in a zig-zag relationship with respect to each other. The conduit 11 extends back and forth in the supporting structures 45 having its longitudinal portions connected by bends 46 in the supporting structures 45 and bends 47 between adjacent ends of adjacent supporting structures. The bends 46 have hinged seat valves 48 therein, controllable by cranks 49 and handle links 50, from the outside of one end of the casing, as is indicated to advantage in Figure 1. A steam pipe 60 extends back and forth between the supporting structures with the conduit 11, for heating the feathers as they pass therethrough. The conduit comes out of the bottom of the casing through the same end through which it enters, and extends into a blower 51, which sucks the feathers through the conduit and blows them out through a conduit 52, leading into the top of one end of the casing 6, opposite to that having the outlets 9 and 18. A vertical deflector 53 is hingedly mounted inside the casing at the outlet end of the conduit 52 and is rocked by the crank 54, with which is connected a link 55 engaged with a crank 56, on a shaft 57, geared to the shaft 28 as at 58.

A deflector 60 is rockably mounted in the casing on an axis transversely thereof, that is, on shaft 61, actuated by a crank 62, connected to a link 63, which in turn is connected with the crank of the crank shaft 64, journaled in the bearing 65, and geared to the shaft 57, as at 66. A plurality of swingable baffles 67 are mounted across the top part of the casing 6, adjacent the outlet end thereof and may be controlled exteriorly of the casing by crank handles 68, as is clearly illustrated in Figure 1.

From the opening in the platform 20, disclosed by the numeral 34, there depends a funnel 70, through one bottom section 7 and terminating in a downwardly tapered casing 71, which empties into a tray 72, having its bottom formed by a plurality of longitudinally extending rods 73, spaced from one another. A crank shaft 74 is mounted in a bearing 75 on the casing 71 and is connected, as at 76, with one end of the tray 72, which is pivoted, as at 77, so as to shake the tray. The shaft 74 is actuated by the link 78, engaged with the crank thereof, and with the crank 42 heretofore mentioned. A trough 79, inclines downwardly under the tray 71, into the hopper 5.

A conduit 85 leads from the conduit 11, at its juncture with the trough 8, to the casing 71, and has a valve plate 86 slidable therethrough in a slide way structure 87. This valve plate is provided with an opening 88 which may be brought into registry with the interior of the conduit 85.

Figure 4:
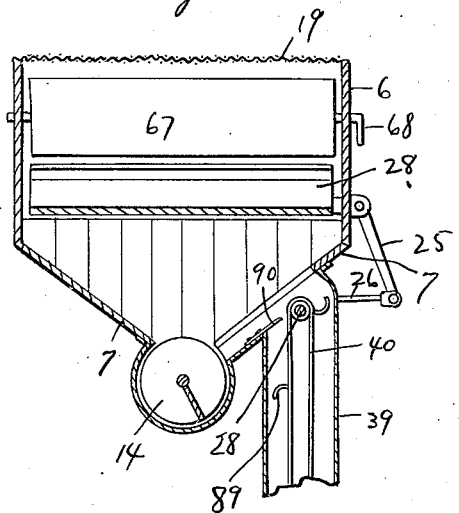

The endless conveyor 40 has teeth 89 thereon which are combed by a comb structure 90 extending inwardly of the casing 39 from the adjacent bottom section 7, as is clearly illustrated in Figure 4.

When the machine is in operation, and damp or wet feathers have been placed in the hopper 5, it will be seen that the features will be conveyed up the elevator into the casing 6 and will gravitate into the auger 14, to be conveyed rearwardly into the conduit 11 and sucked through this conduit and dried while passing therethrough and blown up through the conduit 52 and scattered in the top portion of the casing 6 and the air will pass out through the screening 19. The lighter feathers will exit through the spout 18 and the heavier feathers will exit through the outlet 9. The feathers that are not completely dried will be deposited on the shaker platform 20 back into the auger, and any feathers which are exceedingly wet and heavy will be deflected down through the funnel 70 into the casing 71, to pass through the shaker tray 72 down into the hopper 5. If the valve plate 86 is in its open position, any exceedingly heavy feathers will be allowed to pass into the casing 71 through the conduit 85, so as to be aerated in passing through the tray 71 to be again brought up through the elevator. The deflectors 53 and 60 cooperate together in properly distributing the feathers blown out into the casing.

It is thought that the construction, operation utility and advantages of the invention will now be quite apparent to those skilled in this art, without a more detailed description thereof.

The present embodiment of the invention has been disclosed in detail merely for the purpose of exemplification, since in actual practice, it attains the features of advantage, enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

In a machine of the class described, a casing, a pair of frames mounted vertically in the casing, one adjacent each end thereof, each frame having a plurality of transversely extending racks disposed in zig-zag relationship to each other, a conduit extending back and forth between the racks to provide a gradual incline, and means for creating a current of air through the conduit in the direction of the incline.

In testimony whereof I affix my signature.

DENNIS F. WILLIAMS.